Jan. 22, 1957   C. M. PERKINS   2,778,247
TRANSMISSION CONTROL SYSTEM
Filed May 27, 1955   3 Sheets-Sheet 2
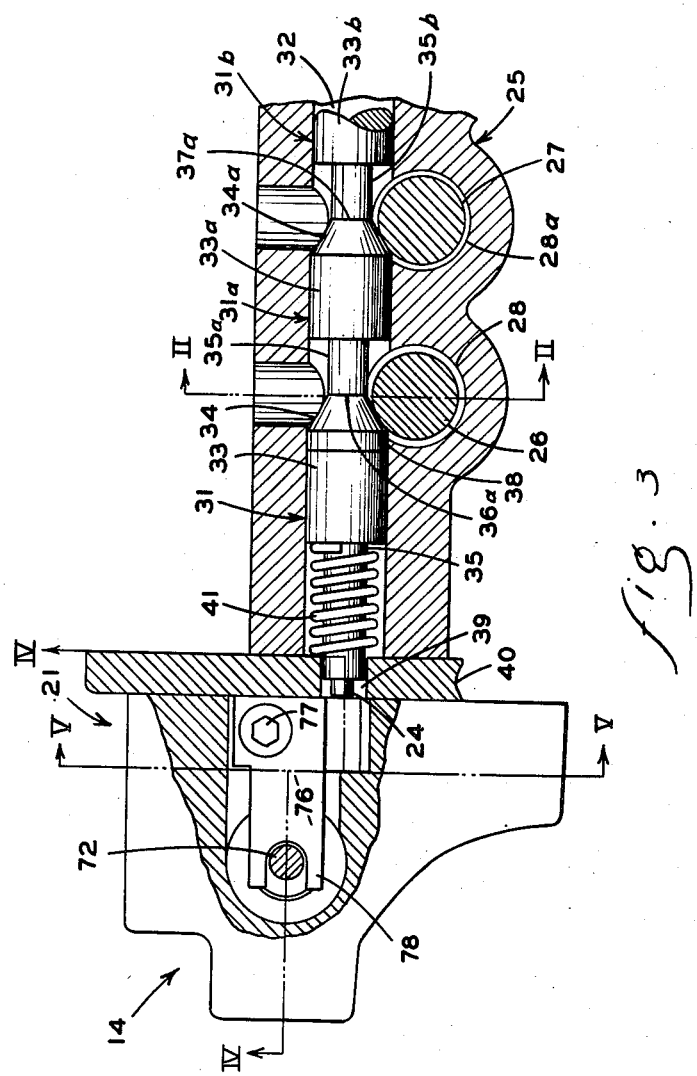
Fig. 3
INVENTOR.
CHARLES M. PERKINS
BY
ATTORNEY

INVENTOR.
CHARLES M PERKINS
BY
ATTORNEY

United States Patent Office 2,778,247
Patented Jan. 22, 1957

2,778,247
TRANSMISSION CONTROL SYSTEM

Charles M. Perkins, Kalamazoo, Mich., assignor to Fuller Manufacturing Company, a corporation of Delaware Application May 27, 1955, Serial No. 511,492

9 Claims. (Cl. 74—745)

*Transmission control system*

This invention relates to a system for controlling the shifting of an auxiliary transmission in response to a position of the main transmission and refers particularly to a control system which permits release of pressure fluid from one side of the power cylinder, which activates the auxiliary transmission, prior to introduction of pressure fluid into the opposite side of said power cylinder.

While the transmission structure described in a patent to Ludvigsen and Backus No. 2,637,221 has operated satisfactorily and has effectively carried out the purposes for which it was invented, it has always been recognized as desirable to increase as much as possible the speed of the response of the fluid pressure controlled auxiliary transmission shifting mechanism to the attainment of a predetermined condition in the main transmission. Endeavoring to meet this need, it has been discovered that the shifting of the device, as a valve, by which the auxiliary shift is effected, may be carried out in two successive stages. The first stage involves releasing the pressure fluid out from the side of the pressure cylinder which was the last to act and a second stage involves introducing new pressure fluid into the opposite side of the pressure cylinder. If this is done, the shifting mechanism acts more rapidly and the shift progresses more smoothly.

Accordingly, a principal object of the invention is to provide a shift controlling device responsive to the position of the main transmission and effective for the shifting of the auxiliary transmission, which is more rapid in operation than previously known devices for this purpose.

A further object of the invention is to provide such a device which is particularly applicable to the shifting of an auxiliary transmission in response to the attainment by a main transmission of its neutral position.

A further object of the invention is to provide such a device wherein the shifting of the auxiliary transmission will be initiated slightly ahead of the complete attainment of neutral position by the main transmission.

A further object of the invention is to provide a device which can be preselected manually in any convenient manner prior to each time that the auxiliary transmission is to be shifted for activating the auxiliary transmission shifting mechanism so that said auxiliary transmission will be shifted automatically and immediately upon the entering into the neutral position of the main transmission.

A further object of the invention is to provide such a device in which pressure fluid on a side of the shifting cylinder for the auxiliary transmission will be relieved prior to the introduction of pressure fluid into the opposite side of said cylinder for effecting the shifting operation.

A further object of the invention is to provide such a device wherein the act of preselecting said auxiliary transmission shifting mechanism will effect a partial movement of a valve structure and thereby effect the relief of pressure fluid on one side of the shifting cylinder prior to the introduction of pressure fluid into the other side of said shifting cylinder, and wherein continued motion of said valve will then introduce pressure fluid into said other side of said cylinder for completing said shifting operation.

Other objects and purposes of the invention will become apparent to persons acquainted with devices of this general type upon a reading of the following specification and examination of the accompanying drawings.

In the drawings:

Figure 3 is a sectional view along the line III—III of Figure 2 through the portion of the transmission containing the shift rods or yoke bar and showing the connection between said portion and the valve controller and valve, said valve and valve controller being partially broken away.

*In general*

In describing the apparatus comprising a preferred embodiment of the invention, use will be made of such words as "rightwardly," or "leftwardly," "upwardly" and "downwardly." These will refer to directions as appearing in the several drawings in which the respective parts are shown. Free use will also be made of such words as "inwardly" and "outwardly," which will refer to directions toward and away from the geometric center of the apparatus under consideration at any given time.

In general, the objects of the invention are carried out by causing a preselection operation to effect a partial movement of the valve structure, which partial movement will cause unloading of the pressure fluid from the desired end of the power cylinder and then utilizing the subsequent completion of movement by the valve to permit introduction of new pressure fluid into the other end of the pressure cylinder.

*Detailed description*

Figure 1:
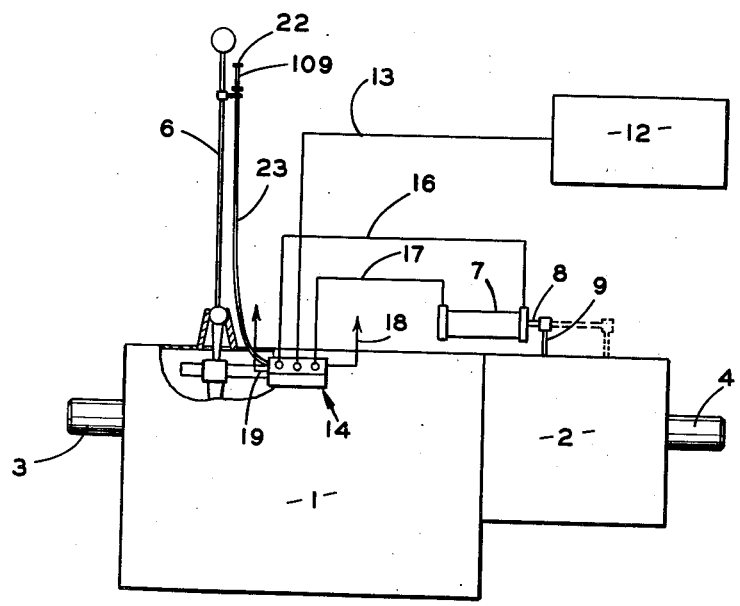
Figure 1 is a schematic, partially broken, illustration of the general organization of apparatus comprising the invention.

Referring in detail to the drawings, and particularly to Figure 1 thereof, there is shown a main transmission 1 in association with a serially connected auxiliary transmission 2. Said main transmission has a power input shaft 3 and the auxiliary has a power output shaft 4. A conventional gear shift lever 6 is provided for manually controlling the shifting of the main transmission 1.

A power cylinder 7 is provided for controlling the shifting of the auxiliary transmission 2, and is arranged to act through a rod 8 and yoke 9 to actuate the auxiliary transmission 2. The main transmission 1 and the auxiliary transmission 2 may advantageously be the same as that disclosed in the above mentioned patent. However, this is given by way of illustration only and it is not intended to limit the scope of the invention to the transmission disclosed therein since it is obvious that this invention can be used in conjunction with other main and auxiliary transmission combinations. A source of pressure fluid is indicated at 12, in this embodiment being assumed to operate at above atmospheric pressures. The pressure fluid from such source is conducted through a conduit 13 to a valve 14. From said valve, pressure fluid is then conducted through conduits 16 and 17 to the opposite ends of the power cylinder 7. Pressure fluid being returned from said power cylinder 7 through the valve 14 is exhausted to the atmosphere or other collector on the low pressure side of the pressure source, through the conduits 18 and 19. A valve controller 21 (Figure 3)

is positioned adjacent to the valve 14 for controlling same and is itself responsive in part to manual operation from a plunger 22 acting through a cable 109, and in part to operation of a spring backed pin 24.

Figure 2:
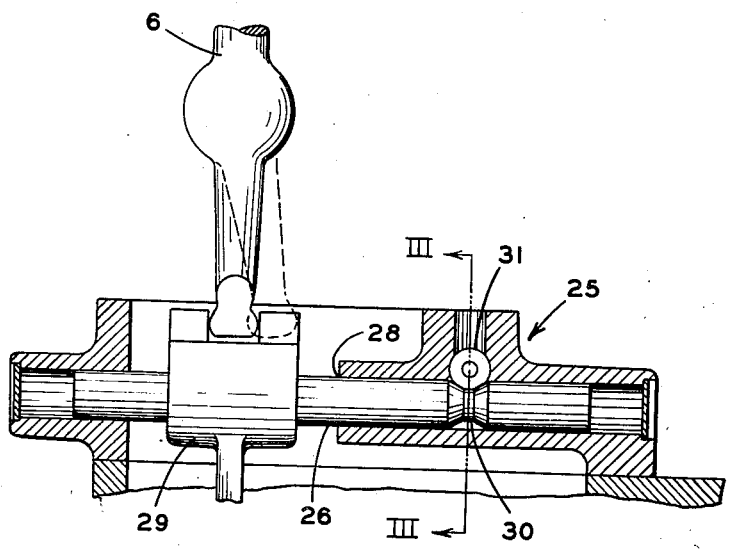
Figure 2 is a vertical, cross-sectional view of that portion of a transmission containing the shift rods or yoke bars and taken along a plane as indicated by the cutting line II—II of Figure 3.

As shown in Figure 3, the mechanism for controlling the movement of pin 24 includes a shaft rod housing 25 on which is mounted the valve controller 21. One or more horizontally disposed, cylindrical shift rods, or yoke bars, such as the shift rods 26 and 27 (Figures 2 and 3), are axially and horizontally slidably disposed within the cylindrical openings 28 and 28a in the housing 25. Each of said rods supports a shift yoke 29 engageable with the lower end of shift lever 6 in a conventional manner. For further details of a typical shift yoke, shift lever and transmission gear housing, which details are not essential to this invention, reference is made to my Patent No. 2,654,268. Each of said shift rods, as for example the shift rod 26, is provided with a co-axial, annular groove 30 intermediate its axial ends, said groove having a bottom wall and a pair of conical end walls at least one of which, and preferably both, are sloped radially outwardly from the other.

The actuator unit, which is preferably comprised of a plurality of separable, co-axial bar elements 31, 31a and 31b is disposed within a cylindrical bar opening 32 for axial and rotational movement therewith. The axis of the opening 32 is perpendicularly transverse to the axes of the shift rods 26 and 27. The axis of bar opening 32 is preferably parallel to the plane through the axes of the shift rods 26 and 27. In this embodiment, the axis of the bar opening 32 is also spaced from the peripheries of said rods 26 and 27.

The bar elements 31, 31a and 31b are preferably substantially identical to each other. As indicated with respect to the bar element 31a in Figure 3, the bar elements are comprised of a central cylindrical portion 33a snugly, but rotatably axially slidably, disposed within the bar opening 32 and having a conical surface 34a at one axial end thereof, which surface is continuously engageable with the periphery of the adjacent shift rod, as shift rod 27. A connector stem 35a of reduced diameter and co-axial with the central portion 33a extends from the other axial end thereof. The axial ends of said bar element 31a are preferably, but not necessarily, provided with flat surfaces, as 36a and 37a perpendicular to the axis of the opening 32. The length of the connector 35a is preferably sufficient to prevent interference of the central portion 33a of the bar element 31a with the shift rod 26 when the shift rod 27 is in the shifted position. The overall length of the bar element 31a is preferably substantially equal to the distance between the axes of the shift rods 26 and 27.

The bar element 31 may be varied from the structure of the other bar elements by providing its central portion 33 with a slight reduction in diameter throughout the major portion of its length, thereby providing a relatively small annular bearing surface 38 for engagement with the walls of the bar opening 32. A connector stem 35 of reduced diameter is integral with central portion 33. Pin 24 is formed integral with connector stem 35 at the leftward end thereof. Pin 24 extends through a connector opening 39 in an end plate 40 on the shift rod housing 25. The connector stem 35 may, as shown in this particular embodiment, be somewhat longer than the corresponding connector stem of the bar elements 31a and 31b for the purpose of extending through said housing plate 40.

A resilient means, such as coiled spring 41, encircles the connector stem 35 within the bar opening 32 between the valve end plate 40 and the central portion 33 of the bar element 31. The spring 41 is under continuous compression, thereby continuously urging the conical end surface 34 against the shift rod 26, hence urging the conical end surface 34a against the shift rod 27, and so on for any number of shift rods when all said rods are in a neutral position. The slope of the conical end surfaces and the end walls of the groove 30, which are engageable with the bar elements in various positions of the shift rods 26 and 27, may vary depending upon the length of the stroke desired in the axial movement of the actuator unit, the diameter of said actuator unit, the diameter of the shift rod, the spacing of the axis of the opening 32 from the axis of the shift rods and the permissible increase in frictional loading on the shift lever 6 and the coefficient of friction between the contacting parts, all in accordance with known engineering practice.

The above described mechanism for controlling the movement of pin 24 is described in greater detail in my copending application Serial No. 484,892, filed January 3, 1955, entitled Shift Actuated Control Device.

Figure 5:
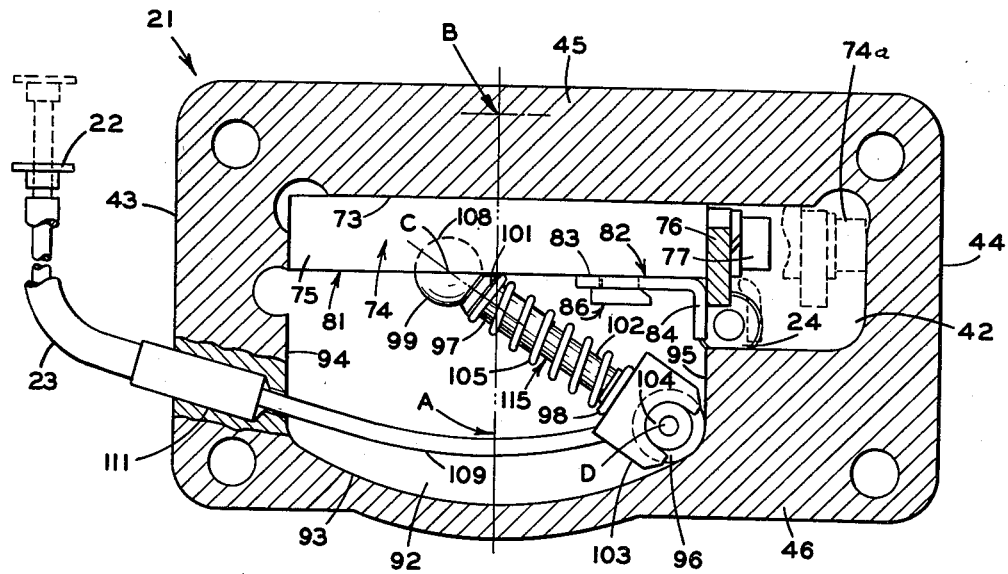
Figure 5 is a sectional view along the line V—V of Figure 3.

The valve control device 21 is disposed within an actuating chamber 42 (Figure 5) of the valve 14 having left and right end walls 43 and 44, respectively, an upper wall 45, a lower wall 46 and a front wall 47. The rear wall is the plate 40 of the housing 25. A partition 49 which is substantially parallel to the rear wall 40 separates the actuating chamber 42 from the valve chamber 50.

The valve chamber 50 (Figure 4) in this particular embodiment, has a cylindrical bore extending through both ends 43 and 44 of the valve 14. Said bore is parallel with said rear wall 40. A passageway 51 communicates between the actuating chamber 42 and the valve chamber 50 near the rightward end of both. A pair of screens 52 and 53, may be mounted in the exhaust ports 54 and 55, respectively, to prevent the entry of foreign materials into the valve chamber 50 while permitting fluid passage therethrough. A pair of cylindrical, spaced valve chamber liners 56 and 57, having co-axial, cylindrical valve piston openings 58 and 59, respectively, are rigidly disposed within the valve chamber 50 between the passageway 51 and the leftward end of said chamber 50. An inlet port 60 which communicates with conduit 13, extends through the front wall 47 of the valve 14 and communicates with the valve chamber 50 between the valve liners 56 and 57. A pair of outlet ports 61 and 62 communicate with the conduits 16 and 17, respectively, and are parallel with and disposed on opposite sides of the inlet port 60. The outlets are in the front wall 47 of the valve 14 and communicate with outlet openings 63 and 64 in the side walls of valve liners 56 and 57, respectively. A pair of annular packing elements 65 and 66 are disposed in appropriate, annular grooves in the inner walls of each of the valve liners 56 and 57 on opposite sides of the outlet openings 63 and 64.

A valve piston 67, having two spaced, co-axial sealing barrels 68 and 69, is slidably disposed within the piston openings 58 and 59, said barrels being snugly embraceable by the packing elements 65 and 66. The barrels 68 and 69 are connected by a rod 70 which is substantially smaller in diameter than the sealing elements 65 and 66 and the piston openings 58 and 59. The length of said rod 70 is preferably such that fluid passing through the inlet port 60 into the center section 71 of the valve chamber 50, between the valve liners 56 and 57 cannot escape through both of the outlet ports 61 and 62 at the same time but both outlet ports can be blocked simultaneously from said center section 71 by the barrels 68 and 69.

At the same time, the overall length of said rod 70 and the barrels 68 and 69 must be such that when the valve piston 67 is in the neutral position, fluid can pass from the cylinder 7 inwardly through both outlet ports 61 and 62 and then exhaust through the exhaust ports 54 and 55 in the leftward and rightward ends, respectively, of the valve chamber 50. A co-axial valve stem 72 extends from, and is secured to, the right end of the valve piston 67 above the passageway 51.

The actuating chamber 42 is preferably elongated and has a planar upper wall 73 (Figure 5) which is parallel with the axis of the chamber 50. A reciprocable member 74 is composed of an elongated, rectangular, actuating bar 75 slidably disposed against, and parallel with said upper wall 73. A connector arm 76 is secured by a bolt 77 to the right end of the bar 75 and extends laterally therefrom through the passageway 51 where its bifurcated end 78 (Figure 4) releasably embraces the stem 72 of the piston 67. A pair of annular flanges 79 and 80 on the valve stem 72 embrace the opposite sides of the connector arm 76. Thus, any longitudinal movement of the bar 75 within the actuating chamber 42 is translated by the connector arm 76 into corresponding longitudinal movement of the piston 67. The overall length of the reciprocable member 74 includes the bar 75, connector arm 76 and bolt 77, which length is preferably shorter than the length of the chamber 42 by an amount substantially equal to the maximum desired axial movement of the valve piston. Thus, the end walls 43 and 44 provide positive limits for the longitudinal movement of the reciprocable member 74 hence for the axial movement of the piston 67. When the reciprocable member 74 is in the solid line position of Figures 4 and 5, the valve piston is in the position shown wherein ports 60 and 61 are in communication. When the reciprocable member 74 is in the dotted line position 74a of Figure 5, the valve piston 67 is in the position wherein ports 60 and 62 are in communication.

The connector arm 76 also extends downwardly a short distance away from the lower side of the actuating bar 75. An L-shaped lost motion bar 82 having a slide leg 83 and a blocking leg 84 is provided with an elongated, lengthwise opening 85 in said slide leg 83. A slide bolt 86 extends through the slide opening 85 and is fixedly received into a suitable opening in the actuating bar 75 for slidably supporting a lost motion bar 82 upon the lower side 81 of the actuating bar 75. The rear wall 40 of the valve and the partition 49 cooperate with the bolt head 88 and actuating bar 75 to restrict movement of the lost motion bar 82 to movement parallel with the movement of the actuating bar. Since the blocking leg 84 at one end of its movement will engage the connector arm 76 and, at the other end of its movement, will engage the edge 87 of the slide bolt head 88, the extent of movement of the lost motion bar is further limited to the distance between the connector arm 76 and the adjacent edge 87 of the slide bolt head 88, less the thickness of the leg 84.

The axis of the blocking element 24 is so located with respect to the reciprocable member 74 that it can be engaged by either side of the blocking leg 84 of the lost motion bar 82 depending upon the direction of movement of the actuating bar prior to the extension of said pin 24 into the chamber 42. When the blocking leg 84 is engaged by said pin 24, the reciprocable member 74, hence the piston 67, is midway between the ends of its stroke regardless of which direction the bar 75 is being urged.

The upper surface of the valve lower wall 46 has a recess 92 which extends from the leftward end of said chamber 42 toward the other end thereof a distance approximately equal to the length of the actuating bar 75. It will be recognized that this distance may be varied substantially within the scope of this invention. The inner or lower wall 93 of the recess 92, opposed to the lower side 81 of the actuating bar 75, is in this embodiment, but not necessarily, uniformly arcuate and concave. In this particular embodiment, the lower wall 93 is a portion of a cylinder whose axis B lies within a plane A parallel with, and midway between, the end walls 94 and 95 of said recess 92. Said axis B is also preferably disposed perpendicularly to the rear wall 40 and above the actuating bar 75 for reasons appearing hereinafter.

A guide 96, which may be a roller, is located within the recess 92 for following the lower wall 93, the axis D of said roller being parallel with said axis B. A toggle member 115 extends between and is pivotally engaged by both the roller 96 and the actuating bar 75. The toggle member 115 is comprised of two slidably telescoped elements 97 and 98. The upper element 97 has a spherical knob 99 at its upper end and a co-axial cylindrical opening 100 in its other end with an annular flange 101 midway between its ends. The lower element 98 has a stem 102 at its upper end slidably receivable into said opening 100 and a bifurcated bearing bracket 103 at the lower end thereof. The bearing bracket 103 extends around and engages the shaft 104 of the guide 96. A spring 105 encircles the telescoped portions of the elements 97 and 98 and is held under compression by the flanges 101 and the bearing brackets 103, preferably at all times. The knob 99 is removably seated in a semispherical recess 108 in the lower side 81 of the actuating bar. The center C of said knob 99 is preferably located in a plane defined by said lower side 81. Said center C preferably moves from a position on one side of the plane A to a position on and about equidistant therefrom on the other side thereof during a full stroke of the actuating bar 75. Dislodgement of the knob 99 from the recess 108 cannot occur so long as the spring 105 remains under some compression and the toggle member 115 is at an angle with the lower side 81 of the bar 75 at all times.

Means such as a cable 109 is secured to the guide 96 in any convenient, conventional manner for effecting movement of said guide 96 along the wall 93. The pivoting of the guide 96 on its shaft 104 permits cable 109 to remain substantially straight in all motions of the device. The other end of said cable 109 may extend through an appropriate bushed opening 111 in either end wall of the valve 14 and thence through the conduit 23 to remotely located toggle control 22, which, as shown, may be mounted on the shift lever 6 of said transmission 1. However, it will be recognized that reference to the transmission and the shift lever thereof is made for illustrative purposes and is not intended to limit the application or the utility of the invention.

With the axis B of the arcuate lower wall 93 disposed above the actuating bar 75, the toggle member 115 will, when moving leftwardly reach a position where the spring 95 surrounding same is under maximum compression. At this point, the axis D of the roller 96 is spaced from the end wall 94 of the recess 92, and is aligned with the center C and the axis B. Further leftward movement of said roller permits expansion of the spring 105 and thereby prevents accidental rightward movement of the roller from the left end of the recess 92 when preselectably placed. It will be noted that this result is reached even though the bar 75 is at the left end of its stroke. The oppositely corresponding situation exists when the roller 96 is at the rightward end of its stroke.

The above described valve and actuator unit therefore are described in greater detail in Serial No. 485,207, filed January 31, 1955, entitled Preselectable Valve Actuator, the applicants therein being myself and Peter J. Visser.

*Operation*

The shift rods 26 and 27 may be, and usually are, movable under the action of shift lever 6 in either direction transverse to the axis of the opening 32. This effects an interengagement of a tapered surface of the groove 30 of a selected one of the shift rods with an actuator bar element to cause an axial movement of one or more of said bar elements. If the shift rod 26, for example, is shifted out of neutral position the bar element 31 will be moved leftwardly and simultaneously rotated during and by movement of said shift rod 26. During such leftward movement of the bar element 31, the pin 24 of the bar element 31 is urged outwardly through the connector opening 39 where it can enter into the chamber 42 and engage blocking leg 84 to prevent movement of leg 84 and thereby prevent movement of the actuating bar 75. The bar elements 31a and 31b may remain substantially as they were prior to such shifting of the shift rod 26. If the shift rod 27 is the one shifted, then both of the bar elements 31 and 31a will be moved leftwardly and simultaneously rotated. Due to the fact that the bar element 31a is snugly disposed between the adjacent end of the bar element 31 and the periphery of the shift rod 27, when all shift rods leftwardly thereof are in neutral position, the leftward movements of both the bar element 31 and the bar element 31a will be equal and simultaneous. Thus, regardless of whether the shift rod 26 or the shift rod 27 is moved out of neutral position, the blocking pin 24 will be moved through the connector opening 39 into the chamber 42 substantially the same distance.

Figure 4:
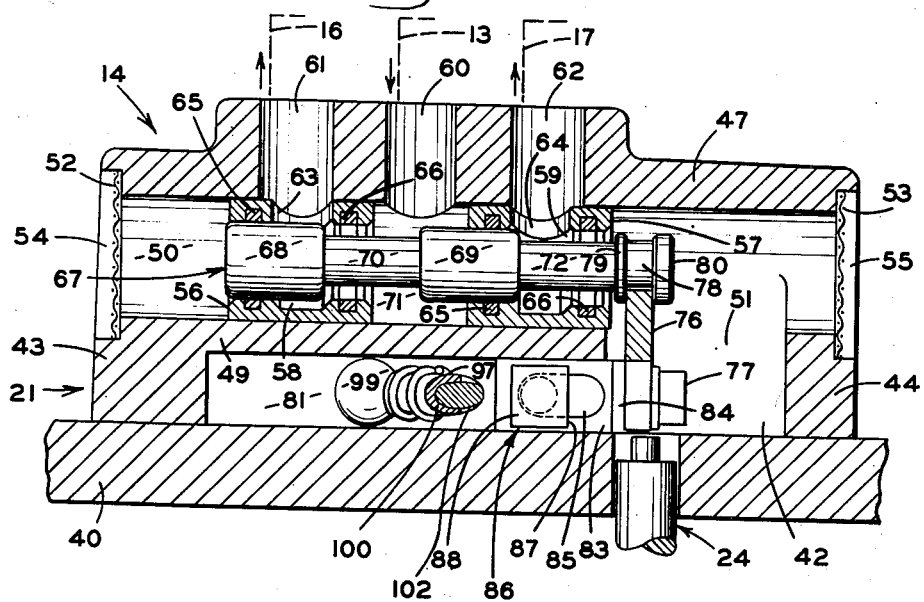
Figure 4 is a sectional view along the line IV—IV of Figure 3.

With the blocking element 24 extended into the chamber 42, the actuating device is ready for preselection by operation, usually manually, of the plunger 22 from its solid line position to its broken line position (Figure 5) which, operating through the cable 109, affects a movement of the guide 96, hence the lower end of the toggle member 115, from the position thereof shown in Figure 4 to the opposite terminal position thereof wherein the roller 96 contacts wall 94. During this movement, the toggle 115 passes through the maximum compression system when the axes D, C and B are aligned and then is materially aided in its continued leftward movement by said spring 105 and effectively locked thereby in the leftward terminal position against the wall 94.

At some position of the toggle member 115, after the guide axis D passes through the plane A, the spring 105 will impose a sufficiently strong, rightwardly directed force upon the actuating bar 75 to move said bar 75 rightwardly into intermediate position thereof wherein element 24 is contacting the rightward face of blocking leg 84. In this position the blocking leg 84 is engaged on its left side by the bolt edge 87 and on its other side by the pin 24 thereby preventing further rightward movement of the actuating bar 75, hence of the reciprocable member 74 of which it is a part. The reciprocable member will remain in this position indefinitely unless the toggle is shifted back to its Figure 4 position by the control 22, or the element 24 is retracted from the chamber 42 by the attainment of neutral position by the main transmission. This position of the actuator will place the associated valve piston 67 in an intermediate position, so that both ends of the power cylinder 7 may have any pressure fluid therein unloaded to the exhaust. In this way, subsequent introduction of pressure fluid to one end or the other of said power cylinder will effect a rapid action thereof in a consequent smooth shift of the transmission mechanism.

When the shift rods 26 and 27 reach their neutral position, spring 41 will cause a retraction of blocking pin 24. The blocking pin 24 will be moved out of the actuating chamber 42, thereby no longer obstructing the path of the blocking leg 84. Thus, the reciprocable member 74 is now free to move rightwardly until its rightward end takes up the broken line position 74a shown in Figure 4 against the right wall 44 of the valve 14. In this position of the reciprocable member 74, the valve structure 67 occupies its full rightward position and the pressure fluid from the source 12 is conducted through the conduit 17 to the leftward end of the cylinder 7 and effects a shift of the auxiliary transmission in a downshift direction. Such shift follows immediately upon the attainment by the main transmission 1 of such a neutral position which effects withdrawal of the element 24.

With the reciprocable member 14 now in its broken line position 74a, another, reverse, cycle operation is commenced by shifting the main transmission 1 out of neutral thereby extending element 24 into the chamber 42 and moving the reciprocable member 74 into its other intermediate position by the operation of the control 22 from its broken line position to its solid line position. In the other intermediate position of the reciprocable member, the element 24 will be contacting the leftward surface of blocking leg 84, and connecting rod 76 will be contacting the rightward surface of leg 84 thereby blocking movement of reciprocable member 74. In this position the valve 67 is moved into a position for connecting both sides of the power cylinder 7 to the atmosphere and the pressure within said cylinder is thereby relieved.

The retraction of the blocking pin 24 from the actuating chamber 42 upon the next attainment of neutral position by the main transmission will release said pin from the blocking leg 84 thereby permitting the compression spring 105 of the toggle member 115 to urge the reciprocable member 74 to its leftward, solid line position shown in Figure 4 and thereby introduce pressure fluid into the opposite end of the power cylinder 7. This completes the reverse cycle of operation of the actuating device.

By thus permitting an initial, limited, motion of the reciprocable member 74, and corresponding initial, limited, motion of the valve pistons 67, it becomes possible upon preselection of the shift mechanism to connect both sides of the power cylinder 7 with the atmosphere prior to introducing shift effecting pressure into said power cylinder.

Summarizing the operations set forth above, any time any one of the shift rods of the main transmission is out of neutral position the blocking pin 24 will be projected into the actuating chamber 42 to limit movement of the reciprocating member 74 from one of its terminal positions to the intermediate positions. The operator, by changing the position of the plunger 22 at any suitable time, can cause the toggle member 115 to be placed in one terminal position with the toggle member so positioned that it is urging the reciprocating member towards its other terminal position. The valve 67 will be in its intermediate position and pressure fluid can discharge from both ends of the power cylinder 7. When the main transmission next reaches its neutral position the blocking pin 24 is automatically retracted and the actuating bar 75 can then immediately move under the urging of the toggle member to its other terminal position. The source of pressure fluid is thereby put in communication with one or the other of the conduit 16 or 17 which are connected to the power cylinder 7. Since the pressure on the opposite side of the piston in the pressure cylinder has been relieved, an extremely quick movement of the piston in the power cylinder 7 can be accomplished.

While the foregoing discussion has assumed throughout that the apparatus is being actuated by super-atmospheric pressure, and such does constitute one preferred means of actuating the mechanism, it will be apparent that the apparatus may also be actuated by vacuum within the scope of the invention and the claims are to be accordingly interpreted. Further, in the case of super-atmospheric pressure actuation, it will be understood that any ordinary fluid, either hydraulic or gaseous, may be utilized within the scope of the invention.

One particular embodiment of the invention has been utilized for illustrative purposes but it will be apparent that many variations from this specific apparatus here shown will occur to those skilled in the art, and the claims are to be interpreted as including such variations excepting as said claims may be their own terms expressly require otherwise.

I claim:

1. Control structure for a transmission having a main shiftable gear unit and an auxiliary shiftable gear unit, comprising in combination: a double acting power cylinder, means connecting said power cylinder to said auxiliary unit for shifting said auxiliary unit; a source of pressure fluid, first means conducting said pressure fluid from said source to a first end of said power cylinder, second means conducting pressure from said source to a second end of said power cylinder, valve structure associated with said first and second means; manually initiable means for relieving pressure fluid in one end of said power cylinder and urging said valve structure in a direction to conduct pressure fluid to the opposite end of said power cylinder, and automatic means responsive to the positioning of an operating part of the main unit in selected positions for respectively preventing and permitting said valve to move in response to said urging.

2. Control structure for a transmission having a main shiftable gear unit and an auxiliary shiftable gear unit, comprising in combination: a double acting power cylinder, means connecting said power cylinder to said auxiliary unit for shifting said auxiliary unit; a source of pressure fluid, first means conducting said pressure fluid from said source to a first end of said power cylinder, second means conducting pressure from said source to a second end of said power cylinder, valve structure associated with said first and second means having a first position for relieving pressure fluid in one end of said power cylinder and second and third positions for conducting pressure fluid to the opposite ends of said power cylinder, and manually actuable means for placing said valve in said first position and simultaneously urging it toward one of said second and third positions; means responsive to the positioning of an operating part of said main unit in selected positions for preventing movement of said valve out of said first position in response to said urging while said main unit is in a shifted position and automatically permitting movement of said valve out of said first position in response to said urging as soon as said main unit attains its neutral position.

3. Control structure for a transmission having a main shiftable gear unit and an auxiliary shiftable gear unit, comprising in combination: a double acting power cylinder, means connecting said power cylinder in said auxiliary unit for shifting said auxiliary unit; a source of pressure fluid, first means conducting said pressure fluid from said source to a first end of said power cylinder, second means conducting pressure from said source to a second end of said power cylinder; valve structure associated with said first and second means; means for simultaneously relieving pressure fluid on one end of said power cylinder and urging said valve in a direction to conduct pressure fluid to the opposite end of said power cylinder, said last-mentioned means effecting said relieving before effecting said conducting; blocking means arresting movement of said valve structure at a point subsequent to the effecting of said relieving action but prior to the effecting of said conducting action; means responsive to a predetermined movement of an element of said main gear unit to a selected position for withdrawing said blocking means, whereby said valve responds to said urging for immediately completing its movement into position for effecting said conducting.

4. A structure as in claim 3 including means responsive to the attainment of neutral position by said main gear unit to move said blocking means to a non-blocking position.

5. Control structure for a transmission having a main shiftable gear unit and an auxiliary shiftable gear unit, the combination comprising: a double acting power cylinder, means connecting said power cylinder to said auxiliary unit for effecting the shifting of said auxiliary unit, a source of pressure fluid, a valve body connected to said source said valve body having a pair of outlet ports, a first conduit connecting one of said valve outlet ports to one side of said power cylinder, a second conduit connecting the other of said valve outlet ports to the other side of said power cylinder, a movable valve element mounted in said valve body, said valve element in one of its terminal positions placing said source in communication with only one side of said power cylinder, said valve element having a second terminal position wherein said source is placed in communication with only the other side of said power cylinder, said valve element having an intermediate position in which both sides of said power cylinder are placed in communication with exhaust, a blocking element movable between a blocking and a non-blocking position, said blocking element when in its blocking position preventing movement of said valve element beyond its intermediate position, means responsive to the positioning of the operating parts of said main gear unit in selected positions for controlling the position of said blocking element.

6. A structure as in claim 5 including means for moving said valve element from one of its terminal positions to its intermediate position, said moving means including a resilient member acting on said valve element and urging said valve element toward the other of its terminal positions whereby when said blocking element is retracted said valve element is immediately moved into its other terminal position.

7. A structure as in claim 6 including spring means mounted on said moving means, said spring means being capable of being placed in two end positions, said spring means urging said valve element toward one of its terminal positions when said spring means is in one of its end positions, said spring means urging said valve element toward the other of its terminal positions when said spring means is in the other of its end positions, manually actuable means for moving said spring means between its two end positions.

8. A structure as in claim 7 wherein said blocking element is moved to its non-blocking position when said main gear unit is in neutral.

9. Apparatus for controlling the shifting of a transmission, said transmission having a manually controlled main transmission unit and an automatically controlled auxiliary transmission unit and a power cylinder responsive to fluid pressure connected to said auxiliary unit for effecting shifting of said auxiliary transmission in response to the attainment of a predetermined position by the main transmission, and including a pin reciprocable automatically in response to a moving of the elements of said main transmission into and out of a selected position comprising the combination: a valve chamber having passageways therethrough and a valve slide therein, said passageways and said slide being cooperable in one terminal position of said slide to conduct pressure fluid from a source into one end of said power cylinder and to conduct pressure fluid from the other end of said power cylinder to exhaust, and in the other terminal position of said slide to conduct pressure fluid from said source to the other end of said cylinder and to conduct pressure from said one end of said cylinder to exhaust and in an intermediate position of said slide adapted for conducting pressure from both ends of said cylinder to exhaust; an actuator for said valve; blocking means responsive to the position of said pin and arresting means associated with said actuator for engagement with said blocking means to limit valve actuating motion of said valve actuator, the point of such limiting being at said intermediate position of said slide; and manually controllable means applying a resilient pressure to said actuator in a selected direction of its stroke; whereby with said main transmission in its normal operating condition, said blocking member will be in blocking position and manual application of said mechanical force will urge said actuator to move from a position at one end of its travel corresponding to one terminal position of said slide to its arrested position and thereby move said slide into said intermediate position to connect both ends of said power cylinder to exhaust and subsequent movement of an element of said main transmission into said selected position will retract said blocking member and automatically effect movement of said actuator into a position at the other end of its travel corresponding to the other terminal position of said slide.

References Cited in the file of this patent

UNITED STATES PATENTS

| | | |
|---|---|---|
| 2,161,153 | Gallun et al. | June 6, 1939 |
| 2,445,716 | Sternberg | July 20, 1948 |
| 2,637,221 | Backus et al. | May 5, 1953 |
| 2,637,222 | Backus | May 5, 1953 |
| 2,654,268 | Perkins | Oct. 6, 1953 |